United States Patent
Ching-Ho et al.

(10) Patent No.: US 6,781,323 B1
(45) Date of Patent: Aug. 24, 2004

(54) ELECTRONIC BALLAST WITH CREST FACTOR CORRECTION

(75) Inventors: Chou Ching-Ho, Taoyuan (TW); Weng Zin-Chi, Taoyuan (TW); Chou John, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/457,075

(22) Filed: Jun. 6, 2003

(51) Int. Cl.[7] .............................................. H05B 41/24
(52) U.S. Cl. ....................... 315/247; 315/291; 315/224
(58) Field of Search ................................ 315/247, 291, 315/307, 224, 209 R, DIG. 2

(56) References Cited

U.S. PATENT DOCUMENTS

| | | | | |
|---|---|---|---|---|
| 5,994,847 A | * | 11/1999 | Konopka | 315/209 R |
| 6,034,489 A | * | 3/2000 | Weng | 315/307 |
| 6,642,670 B2 | * | 11/2003 | Zhang et al. | 315/247 |
| 6,674,248 B2 | * | 1/2004 | Newman, Jr. et al. | 315/247 |

* cited by examiner

*Primary Examiner*—Ephrem Alemu
(74) *Attorney, Agent, or Firm*—Perkins Coie LLP

(57) ABSTRACT

Low cost electronic ballast does not have a function of crest factor correction in those conventional arts, and so a life span of a fluorescent lamp using the electronic ballast decreases due to a high crest factor correction. In the present invention, it provides a low cost electronic ballast controller that varies an operating frequency according to a voltage feedback to control a lamp current for achieving an objective of crest factor correction.

20 Claims, 3 Drawing Sheets

ELECTRONIC BALLAST WITH CREST FACTOR CORRECTION

BACKGROUND

1. Field of the Invention

This invention relates to a electronic ballast, and more particularly to a electronic ballast with crest factor correction.

2. Description of the Prior Art

A crest factor (C.F.) of lamp current in a fluorescent lamp is defined as the ratio of a peak current of current wave packet in a lamp and a RMS (root mean square) current thereof after the lamp has been ignited. But, many high frequency signals hides in the AC (alternating current) current and so the C.F. value is larger than the ideal value of 1.414. The value of the C.F directly effects a life span of the lamp. Many major lamp manufactures have imposed a maximum value of 1.7, and high C.F. values will shorten the normal life span of the fluorescent lamp.

Electronic ballasts with higher power factor correction (PFC) are being imposed worldwide in order to maximum the efficiency of existing power generation capacity. Adding additional power plant is expensive and increasingly difficult and the burden of good quality power actually falls on the power user rather than the power supplier. Therefore, a cost effective method of power factor correction is a major task for many electronic ballast engineers.

There are two basic types of PFC circuits, namely active PFC circuit and passive PFC circuit. FIG. 1 shows a typical active PFC circuit, wherein the symbol of 10 represents a bridge rectifier. It uses a boost topology and a high frequency switching MOSFET to achieve high power factor. The boost topology of FIG. 1 may be operated at variable frequency mode with continuous inductor current or in the critical conduction mode where the inductor is allowed to discharge to zero energy in before initiating a new charge cycle. The active PFC circuit is entirely satisfactory for harmonic compliance and so is capable of achieving a power factor up to 99%. However, the material cost is high since it requires a controller PFC, an inductor L1, a high-speed power MOSFET Q1 and a fast recovering diode D1.

On the other hand, the passive PFC circuit uses only passive parts and cost less than the active PFC circuit. FIG. 2 shows a simple L-C passive PFC circuit. This type of circuit operates at main frequency (50 Hz or 60 Hz) using PFC choke L1 and capacitor C1 tuned to the main frequency in a low pass filter configuration. Unfortunately, due to operating at mains frequency, a large capacitance and a large inductance are required, especially the physical size and weights of the inductor L1 is very big and a unpleasant buzz is occurred. Hence, the passive PFC is seldom used now although it is capable of achieving a good performance.

Recently, there are many low cost PFC circuits, for example: valley fill PFC circuit. FIG. 3A shows a valley fill PFC circuit achieving a high power factor of 93%–95%. In this circuit, the filter capacitors C1 and C2 are charged in series via the diode D2 on each half cycle of the rectified AC input. Each capacitor is charged to ½ of the AC peak voltage (assuming no voltage drop across diodes D1, D2, and D3). Since each capacitor is charged up to ½ of the AC peak voltage, the capacitors C1 and C2 supply a output current only after the DC rail follows the sinusoidal waveform down to ½ of the AC peak voltage. At this time, the capacitors C1 and C2 are essential in parallel and supply the load current until the rectified AC input exceeds ½ of the AC peak voltage again at next half cycle (assuming the capacitances of the capacitors C1 and C2 being very large and so the voltage of the capacitors C1 and C2 not decreases after discharged). The waveform of the output DC voltage is shown as FIG. 3B. By a simple calculation, the ratio of the time when the value of a sinusoidal waveform is less than ½ of the maximum value thereof and total time is about 37%, namely the discharge duty cycle of capacitors C1 and C2 is around 37% followed by an idle period of around 63%. During the idle period the load is being supplied directly from the rectified AC input. This greatly increases the power quality and increases the power factor. The drawback of valley fill PFC circuit is the big ripple (½ of AC input) voltage at the DC output. Any electronic ballast using such DC bus without regulating the lamp current will result in a higher valve of crest factor. Most low cost half-bridge MOSFET drivers or controllers used in electronic ballast for a fluorescent lamp don't have the capability of regulating the lamp current. In most cases, the operating frequency of the driver is fixed after the timing capacitor and resistor has been chosen. Any electronic ballast that is designed using such low cost controller or MOSFET driver, the lamp current is not regulated. Hence, if a voltage of a DC bus varies supplying to the electronic ballast, the lamp current also varies with the DC ripple. It is possible that the crest factor of lamp current might be higher than 1.7 and shorten the lamp life span. Hence, the valley fill PFG circuit is not suitable for the low cost electronic ballast without the capability of regulating the lamp current. FIG. 4A shows a typical electronic ballast using valley fill PFC without regulating lamp current, wherein the symbol of 20 represents a half-bridge MOSFET driver, the symbol of 30 represents a lamp. The current waveform of the lamp 30 is shown as FIG. 4B. The C.F. value of lamp current can easily go much higher than 1.7.

SUMMARY

In those conventional arts, the low cost electronic ballast with high power factor does not have the capability of regulating the lamp current and so the life span of the lamp is shortened. Moreover, the cost of the electronic ballast having the capable of high power factor and regulating the lamp current simultaneously is very high. One of objectives of the present invention is to provide simple low cost electronic ballast controller for electronic ballast with capable of crest factor correction for efficiently lengthening the life span of a lamp.

Another objective of present invention is employ a electronic ballast controller to correct the crest factor of lamp current for reducing the crest factor of the lamp current.

As aforementioned, the present invention provides an electronic ballast. The electronic ballast comprises a full-wave rectifier, an inverter, a power factor correction means, a voltage signal generator, a controller, a L-C resonant circuit. Wherein when a rectified voltage increases, the inverter increases a resonant frequency of a output AC voltage according to a switch signal for reducing a current passing through a inductor of the L-C resonant circuit, and when the rectified voltage decreases, the inverter decreases the resonant frequency of the output AC voltage according to the switch signal for increasing the current passing through the inductor.

The present invention also provides an electronic ballast with crest factor correction for a fluorescent lamp. The electronic ballast comprises a full-wave rectifier, an inverter, a valley fill circuit, a voltage signal generator, a controller, and a L-C resonant circuit. Wherein when a rectified voltage increases, the inverter increases a resonant frequency of a output AC voltage according to a switch signal for reducing a current passing through a inductor of the L-C resonant circuit, and when the rectified voltage decreases, the inverter decreases the resonant frequency of the output AC voltage according to the switch signal for increasing the current passing through the inductor.

Compared with the low cost electronic ballast with high power factor does not have the capability of regulating the lamp current in those conventional arts and so the life span of the lamp is shortened. On the other hand, the cost of the electronic ballast having the capable of high power factor and regulating the lamp current simultaneously is very high. The present invention employs a voltage feedback signal to adjust the operating frequency for simply controlling the lamp current. Hence, a simple low cost electronic ballast controller with capable of crest factor correction is used for electronic ballast to efficiently reduce the crest factor of the lamp current and lengthen the life span of a lamp.

BRIEF DESCRIPTION OF THE DRAWINGS

The foregoing aspects and many of the attendant advantages of this invention will become more readily appreciated as the same becomes better understand by reference to the following detailed description, when taken in conjunction with the accompanying drawings, where in.

DETAILED DESCRIPTION

Some sample embodiments of the invention will now be described in greater detail. Nevertheless, it should be recognized that present invention can be practiced in a wide range of other embodiments besides those explicitly described, and the scope of the present invention is expressly not limited expect as specified in the accompanying claims.

Then, the components of the different elements are not shown to scale. Some dimensions of the related components are exaggerated and meaningless portions are not drawn to provide a more clear description and comprehension of the present invention.

Figure 1:
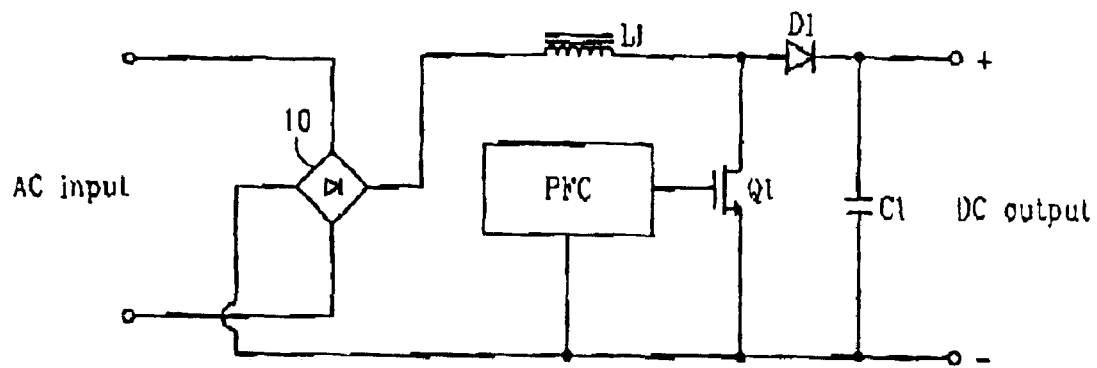
FIG. 1 is a schematic diagram of an active PFC circuit in the conventional arts.
Figure 2:
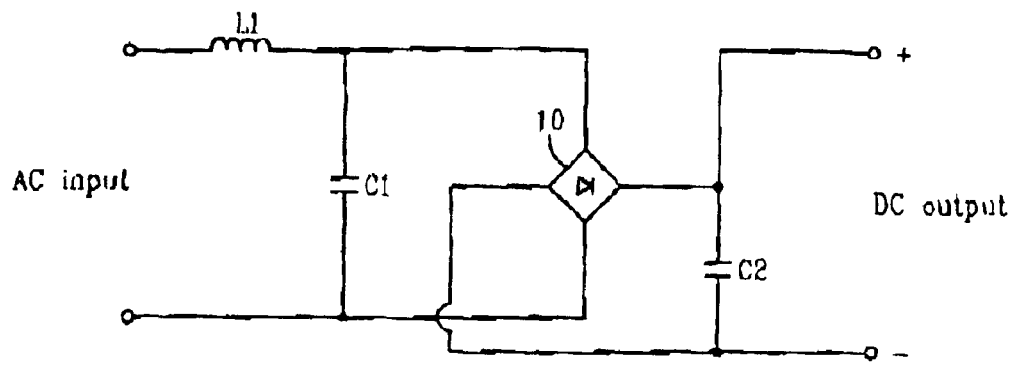
FIG. 2 is a schematic diagram of a passive PFC circuit in the conventional arts.
Figure 3A:
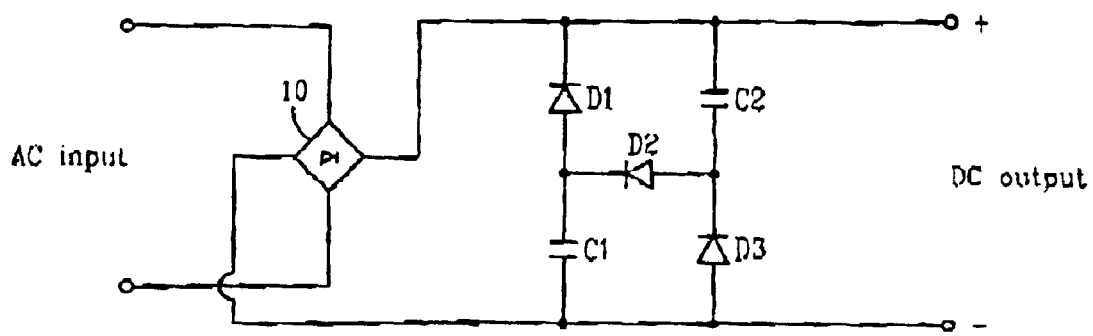
FIG. 3A a schematic diagram of a electronic ballast with a valley fill PFC circuit in the conventional arts.
Figure 3B:
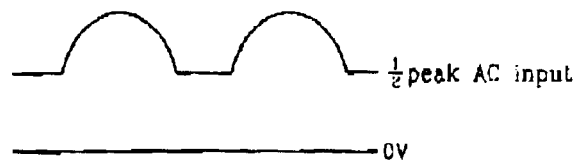
FIG. 3B is schematic diagram of a output voltage waveform in the electronic ballast shown in FIG. 3A.
Figure 4A:
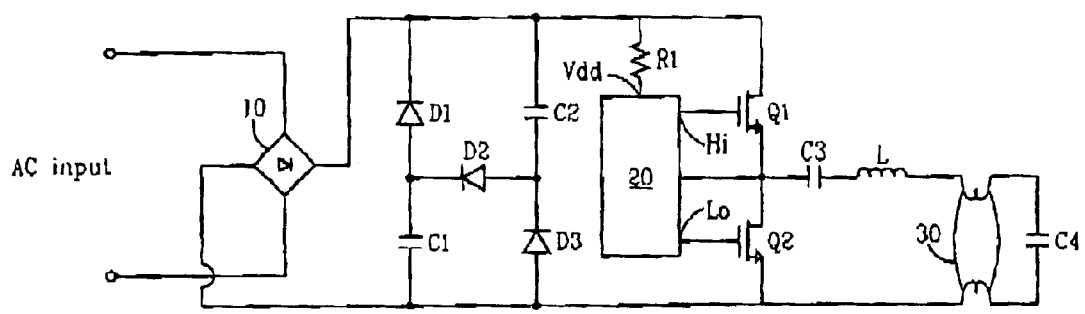
FIG. 4A a schematic diagram of an electronic ballast using valley fill PFC without regulating lamp current in the conventional arts.
Figure 4B:
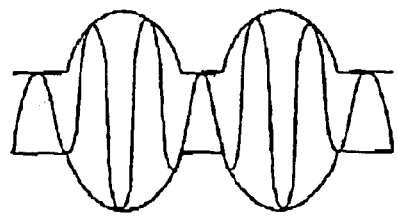
FIG. 4B is schematic diagram of a lamp current waveform in the electronic ballast shown in FIG. 4A.
Figure 5:
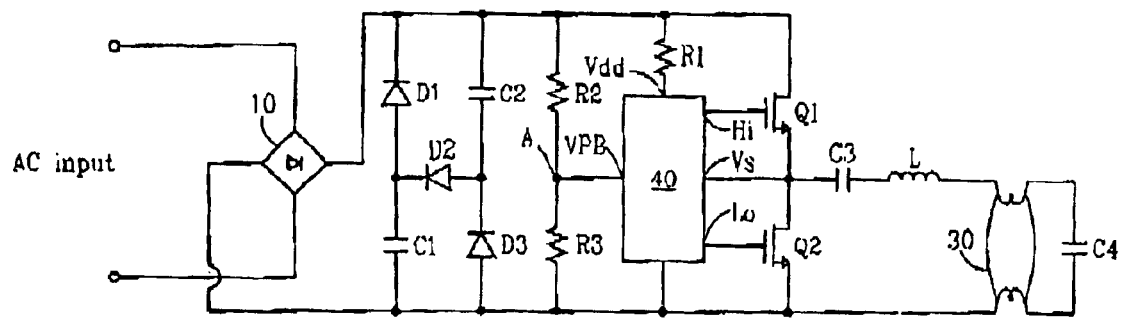
FIG. 5 is a schematic diagram of one preferred embodiment of electronic ballast in the present invention.

For electronic ballast, the most cost effective topology is a half-bridge L-C resonant circuit. FIG. 5 shows one preferred embodiment of a half bridge L-C resonant electronic ballast using valley fill PFC with crest factor correction in the present invention, wherein the symbol of 40 represents a low cost electronic ballast controller with crest factor correction. The resistance R1 provides a voltage Vdd as a positive power source for the controller 40. The resistances R2 and R3 are connected in series and provide a divided voltage at the point A as a voltage feedback signal $V_{FB}$ for the controller 40. The voltage feedback signal $V_{FB}$ may be provided by any voltage signal generator. Two high voltage MOSFETS Q1 and Q2 are composed of a half-bridge DC/AC inverter and the controller switches the MOSFETS Q1 and Q2 alternately through the terminals Hi and Lo to invert DC to Ac for driving the lamp 30. The electronic ballast controller with crest factor correction uses minimum components for lamp ignition and lamp current limit. With this topology, the L-C resonant circuit can be used to ignite the lamp by operating the switching frequency near the resonant frequency of L-C resonant tank L and C4. After the ignition, L can be used as a current limit device for the lamp. The impedance of the inductor L is proportional to the operating frequency. Therefore, when the voltage of the DC bus increases, the voltage of the voltage feedback signal $V_{FB}$ also increases, and then the controller 40 receives the signal and so increases the operating frequency of the MOSFETS Q1 and Q2 for restraining the lamp current. On the other hand, when the voltage of the DC bus decreases, the voltage of the voltage feedback signal $V_{FB}$ also decreases, and then the controller 40 receives the signal and so decreases the operating frequency of the MOSFETS Q1 and Q2 for retarding the decreasing rate of the lamp current. Hence, the lamp current can be controlled by simply varying the operating frequency.

Figure 6:
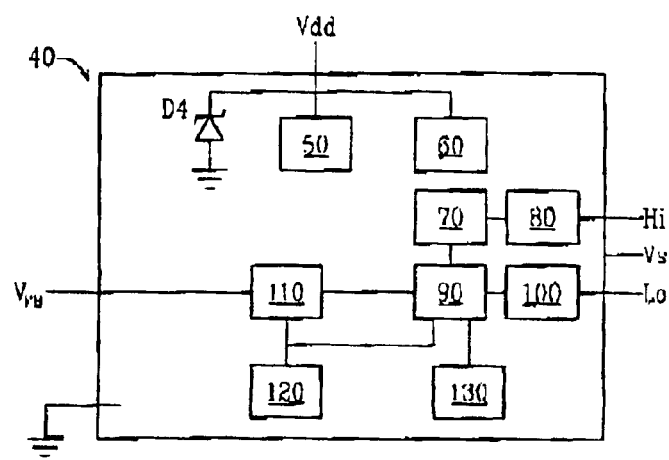
FIG. 6 is a block diagram of the electronic ballast controller with crest factor correction.

FIG. 6 shows a simplified block diagram of the low cost electronic ballast controller with crest factor correction. The voltage Vdd is the positive voltage source of the controller 40 and is controlled by Band Gap Reference 50. If the voltage Vdd is too high, the zener diode D4 conducts for limiting the increasing of the voltage Vdd. If the voltage Vdd is too low, Under Voltage Lookout 60 prevent from fault due to too low voltage. High Side Driver 80 and Low Side Driver 100 provide the switch signals of Hi and Lo respectively. The signal Vs, Hi, and Lo are the driving signal of MOSFETs Q1 and Q2 shown in FIG. 5. After Pre-heat and Ignition Controller 120 has preheated with a frequency higher than the resonant frequency of the half-bridge L-C resonant circuit, Pre-heat and Ignition Controller 120 ignites the lamp with a operating frequency near the resonant frequency. Protection Logic Controller 130 is a typical protection logic controller for protecting the electronic ballast form fault. Voltage Control Oscillator 110 receives the voltage feedback signal $V_{FB}$ for generating an oscillating frequency to Control Logic 90. Level Shift 70 is used to transfer control signal levels of Control Logic 90 into a driving voltage level. The aforementioned devices 50, 60, 70, 80, 90, 100, 110, 120, and 130 may be typical devices.

Figure 7:
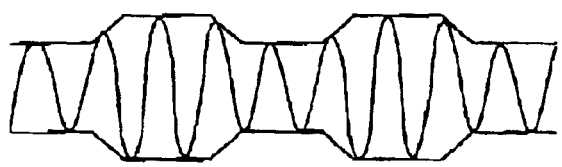
FIG. 7 is s schematic diagram of a lamp current waveform of the electronic ballast in the present invention.

The present invention regulates the lamp current based on the DC ripple voltage feedback $V_{FB}$ to achieve a low value of crest factor. When the voltage of the DC bus feedback increases, the voltage across the series R2 and R3 increases and so the voltage feedback $V_{FB}$ coming form the point A also increases. At this time, the controller increases the operating frequency and the impedance of the inductor L1 is increased for reducing the lamp current. On the other hand, when the voltage of the DC bus feedback decreases, the voltage across the series R2 and R3 decreases and so the voltage feedback $V_{FB}$ coming form the point A also decreases. At this time, the controller reduces the operating frequency and the impedance of the inductor L1 is decreased for increasing the lamp current. The corrected current waveform is shown as FIG. 7, the higher parts and the lower parts of the current is corrected and so the crest factor can be reduced efficiently. The frequency are preferably between 50 kHz and 80 kHz. In this way the system can easily reduce the crest factor to be less than 1.7.

Compared with conventional method, there are some unique features that make this invention innovation. As shown in FIG. 6, the ballast system is a very low cost solution. It doesn't require any lamp current feedback from the lamp for controlling lamp current. Instead, it uses DC rail voltage feedback $V_{FB}$, as the control signal to regulate the lamp current. In the conventional arts, the current feedback must be transferred into a voltage feedback and so it requires external devices to obtain the current feedback and transfer current feedback into voltage feedback. Therefore, the voltage feedback signal is easier to obtain and the cost is lower, compared with the current feedback. The controller 40 takes the DC bus voltage feedback $V_{FB}$ and adjusts the operating frequency to regulate the lamp current for lower crest factor of the lamp current. In addition, unlike conventional electronic ballast that can regulate the lamp current, this invention does not require a costly close-loop control system. The main purpose for this invention is to reduce the crest factor rather than very tight lamp current regulation. Therefore, costly close-loop control is not necessary. Because this is an open-loop system, there is not any concern regarding instability issue as a close-loop system.

Some suppliers of conventional half-bridge MOSFET driver or low cost ballast controller have proposed a discrete solution to this problem. Their solution requires external parts and provides only step changes of the operating frequency for crest factor correction. As a result, their system cost more and the performance thereof is not satisfactory. On the other hand, the system of the present invention is an integrated circuit and provides a linear continuous adjustment of the lamp current based on the DC rail voltage feedback $V_{FB}$. It provides a low cost and reliable solution with better performance.

As aforementioned, the present invention discloses an electronic ballast. The electronic ballast comprises a full-wave rectifier, an inverter, a power factor correction means, a voltage signal generator, a controller, a L-C resonant circuit. Wherein when a rectified voltage increases, the inverter increases a resonant frequency of a output AC voltage according to a switch signal for reducing a current passing through a inductor of the L-C resonant circuit, and when the rectified voltage decreases, the inverter decreases the resonant frequency of the output AC voltage according to the switch signal for increasing the current passing through the inductor.

The present invention also discloses an electronic ballast with crest factor correction for a fluorescent lamp. The electronic ballast comprises a full-wave rectifier, an inverter, a valley fill circuit, a voltage signal generator, a controller, and a L-C resonant circuit. Wherein when a rectified voltage increases, the inverter increases a resonant frequency of a output AC voltage according to a switch signal for reducing a current passing through a inductor of the L-C resonant circuit, and when the rectified voltage decreases, the inverter decreases the resonant frequency of the output AC voltage according to the switch signal for increasing the current passing through the inductor.

Compared with the low cost electronic ballast with high power factor does not have the capability of regulating the lamp current in those conventional arts and so the life span of the lamp is shortened. On the other hand, the cost of the electronic ballast having the capable of high power factor and regulating the lamp current simultaneously is very high. The present invention employs a voltage feedback signal to adjust the operating frequency for simply controlling the lamp current. Hence, a simple low cost electronic ballast controller with capable of crest factor correction is used for electronic ballast to efficiently reduce the crest factor of the lamp current and lengthen the life span of a lamp.

Although specific embodiments have been illustrated and described, it will be obvious to those skilled in the art that various modifications may be made without departing from what is intended to be limited solely by the appended claims.

What is claimed is:

1. An electronic ballast, comprising:
   a full-wave rectifier for rectifying a AC input voltage to a rectified voltage;
   an inverter for said rectified voltage to a output AC voltage;
   a power factor correction means connecting between said full-wave rectifier and said inverter for increasing a power factor of said full-wave rectified;
   a voltage signal generator connecting between said power factor correction means and said inverter for providing a voltage signal;
   a controller connecting between said voltage signal generator and said inverter for outputting a switch signal to said inverter according to said voltage signal; and
   a L-C resonant circuit comprising a resonant inductor and a resonant capacitor and connecting between said inverter and a lamp,
   wherein when said rectified voltage increases, said inverter increases a resonant frequency of said output AC voltage according to said switch signal for reducing a current passing through said inductor, and when said rectified voltage decreases, said inverter decreases said resonant frequency of said output AC voltage according to said switch signal for increasing said current passing through said inductor.

2. The electronic ballast in claim 1, wherein said full-wave rectifier is a bridge rectifier.

3. The electronic ballast in claim 1, wherein said inverter is a half-bridge DC/AC inverter.

4. The electronic ballast in claim 3, wherein said half-bridge DC/AC inverter comprises two MOSFETs.

5. The electronic ballast in claim 1, wherein said voltage signal generator is a series resistor circuit.

6. The electronic ballast in claim 5, wherein said series resistor circuit comprises two resistors.

7. The electronic ballast in claim 1, wherein said controller proceeds a preheating process with a frequency higher than a resonant frequency of said L-C resonant circuit.

8. The electronic ballast in claim 1, wherein said controller proceeds a igniting process with a frequency near said resonant frequency of said L-C resonant circuit.

9. The electronic ballast in claim 1, wherein a frequency of said switch signal is between 50 kHz and 80 kHz.

10. The electronic ballast in claim 1, wherein said voltage signal increase when said rectified voltage increases and said voltage signal reduces when said rectified voltage reduces.

11. An electronic ballast with crest factor correction for a fluorescent lamp, comprising:
    a full-wave rectifier for rectifying a AC input voltage to a rectified voltage;
    an inverter for said rectified voltage to a output AC voltage;

a valley fill circuit connecting between said full-wave rectifier and said inverter for increasing a power factor of said full-wave rectified, and comprising at least two capacitors and three diodes for charging said two capacitors in series when a voltage across said two capacitors lower than said rectified voltage and discharging said two capacitors in parallel when a voltage across said two capacitors lower than said rectified voltage;

a voltage signal generator connecting between said valley fill circuit and said inverter for providing a voltage signal;

a controller connecting between said voltage signal generator and said inverter for outputting a switch signal to said inverter according to said voltage signal; and a L-C resonant circuit comprising a resonant inductor and a resonant capacitor and connecting between said inverter and a lamp, wherein when said rectified voltage increases, said inverter increases a resonant frequency of said output AC voltage according to said switch signal for reducing a current passing through said inductor, and when said rectified voltage decreases, said inverter decreases said resonant frequency of said output AC voltage according to said switch signal for increasing said current passing through said inductor.

12. The electronic ballast in claim 11, wherein said full-wave rectifier is a bridge rectifier.

13. The electronic ballast in claim 11, wherein said inverter is a half-bridge DC/AC inverter.

14. The electronic ballast in claim 13, wherein said half-bridge DC/AC inverter comprises two MOSFETs.

15. The electronic ballast in claim 11, wherein said voltage signal generator is a series resistor circuit.

16. The electronic ballast in claim 15, wherein said series resistor circuit comprises two resistors.

17. The electronic ballast in claim 11, wherein said controller proceeds a preheating process with a frequency higher than a resonant frequency of said L-C resonant circuit.

18. The electronic ballast in claim 11, wherein said controller proceeds a igniting process with a frequency near said resonant frequency of said L-C resonant circuit.

19. The electronic ballast in claim 11, wherein a frequency of said switch signal is between 50 kHz and 80 kHz.

20. The electronic ballast in claim 11, wherein said voltage signal increase when said rectified voltage increases and said voltage signal reduces when said rectified voltage reduces.

* * * * *